(12) United States Patent
Rochard et al.

(10) Patent No.: US 12,259,262 B2
(45) Date of Patent: Mar. 25, 2025

(54) METHOD FOR DIAGNOSING A SPEED/POSITION SENSOR

(71) Applicant: VITESCO TECHNOLOGIES GMBH, Regensburg (DE)

(72) Inventors: Pascal Rochard, Toulouse (FR); Stéphane Eloy, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 138 days.

(21) Appl. No.: 17/916,523

(22) PCT Filed: Mar. 31, 2021

(86) PCT No.: PCT/EP2021/058483
§ 371 (c)(1),
(2) Date: Sep. 30, 2022

(87) PCT Pub. No.: WO2021/198359
PCT Pub. Date: Oct. 7, 2021

(65) Prior Publication Data
US 2023/0152127 A1    May 18, 2023

(30) Foreign Application Priority Data
Apr. 1, 2020 (FR) ...................................... 2003245

(51) Int. Cl.
*G01D 5/24* (2006.01)
*G01D 5/244* (2006.01)
*G01P 21/02* (2006.01)

(52) U.S. Cl.
CPC .......... *G01D 5/24457* (2013.01); *G01P 21/02* (2013.01)

(58) Field of Classification Search
CPC ........ F02D 9/1065; F02D 11/00; F02D 11/02; F02D 41/0007; F02D 41/20; F02D 41/22;
(Continued)

(56) References Cited

U.S. PATENT DOCUMENTS

| 5,686,672 A | * | 11/1997 | Klauber | ............... B60G 17/019 73/114.15 |
| 6,014,091 A | | 1/2000 | Noltemeyer et al. | |

(Continued)

FOREIGN PATENT DOCUMENTS

| CA | 340204 A | 3/1934 |
| CN | 110687312 A | 1/2020 |

(Continued)

OTHER PUBLICATIONS

Office Action issued in Chinese Patent Application No. 202180026325.5 dated Oct. 28, 2023.

(Continued)

*Primary Examiner* — Logan M Kraft
*Assistant Examiner* — Johnny H Hoang
(74) *Attorney, Agent, or Firm* — NIXON & VANDERHYE

(57) ABSTRACT

Disclosed is a method for diagnosing a speed/position sensor of an internal combustion engine, of the type including a toothed wheel, which rotates as one with a shaft, and a matter detector, which is arranged so as to be fixed opposite the toothed wheel and controls a base of a transistor. The method includes: detecting a short circuit between an output of the speed/position sensor and a power supply; and testing for excess current consumption by a power supply of the speed/position sensor when the transistor is activated. If the test is positive, the short circuit is identified between the power supply of the speed/position sensor and the output of the speed/position sensor. Alternatively, if the test is negative, the short circuit is identified between another power supply and the output of the speed/position sensor.

16 Claims, 2 Drawing Sheets

(58) Field of Classification Search
CPC ....... F02D 41/222; B62K 11/14; B62K 23/04;
B62K 26/021; G01D 3/08; G01D 3/489;
G01D 5/145; G01D 5/24; G01D 5/24547;
G01D 18/00; G01D 21/02; G01P 21/02;
G01M 15/04; F02B 39/16; H04B
2203/5458; H04B 2203/547; H04B
2203/5416
USPC ................ 73/114.04, 114.24, 114.26, 114.36
See application file for complete search history.

(56) References Cited

U.S. PATENT DOCUMENTS

| | | | |
|---|---|---|---|
| 10,377,360 B1 | 8/2019 | Abaziou et al. | |
| 10,723,404 B2* | 7/2020 | Trocme | B62K 11/14 |
| 2012/0078564 A1* | 3/2012 | Goodwin | G01D 18/00 |
| | | | 702/116 |
| 2012/0092001 A1* | 4/2012 | Labiste | G01D 3/08 |
| | | | 324/207.2 |
| 2012/0173076 A1* | 7/2012 | Anderson | F02D 41/221 |
| | | | 73/114.31 |
| 2017/0307476 A1* | 10/2017 | Leroy | G01M 15/06 |
| 2019/0064207 A1* | 2/2019 | Mirassou | G01P 3/489 |
| 2019/0249618 A1* | 8/2019 | Dudar | F01L 13/0005 |
| 2020/0256708 A1* | 8/2020 | Larue | F02D 41/009 |
| 2020/0271049 A1* | 8/2020 | Krogmann | F02B 39/16 |
| 2021/0213593 A1* | 7/2021 | Ichikawa | B25B 21/02 |

FOREIGN PATENT DOCUMENTS

| | | |
|---|---|---|
| DE | 10 2019 209 359 | 2/2020 |
| JP | 2020036095 A | 3/2020 |

OTHER PUBLICATIONS

International Search Report and Written Opinion of the ISA for PCT/EP2021/058483 dated Jun. 21, 2021, 14 pages.

* cited by examiner

[Fig. 1]
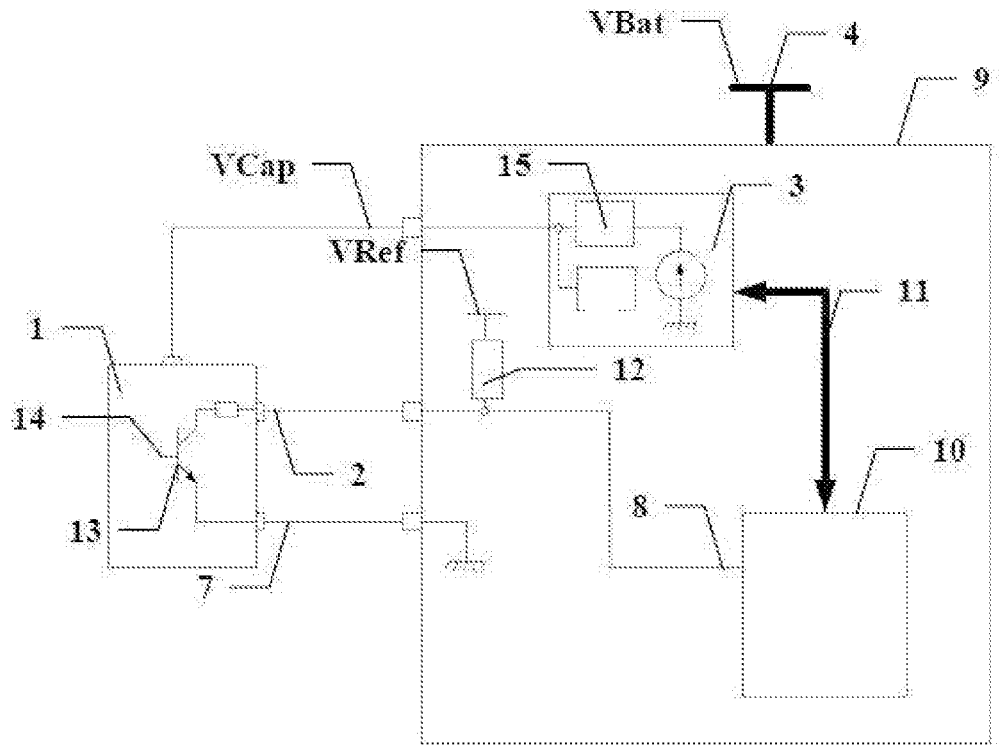
[Fig. 2]
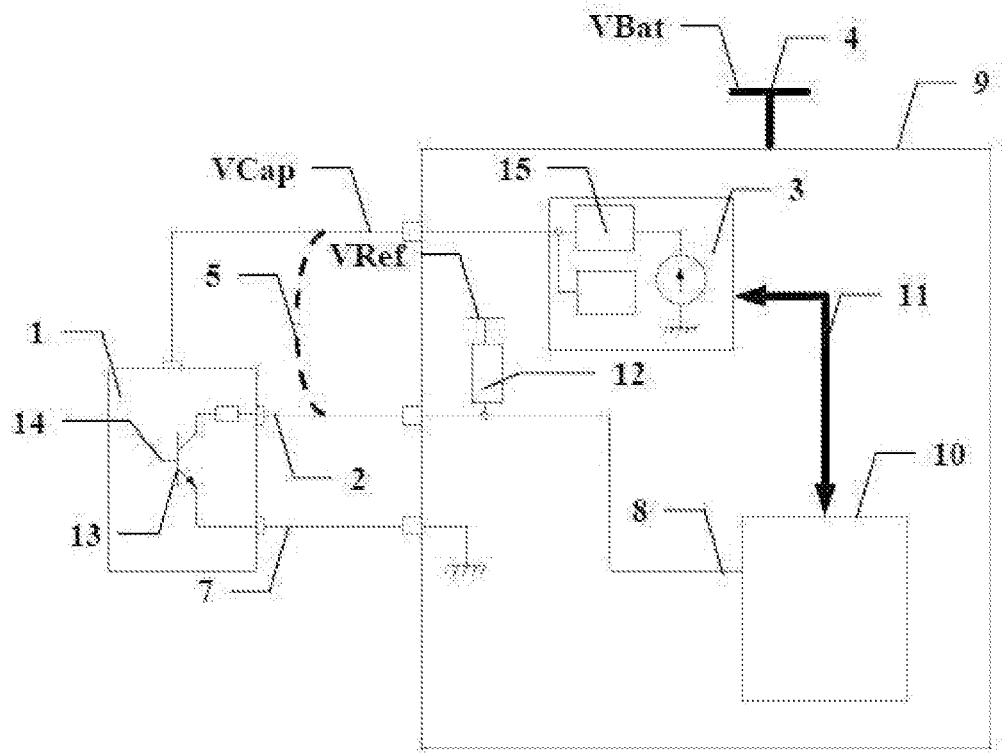

[Fig. 3]
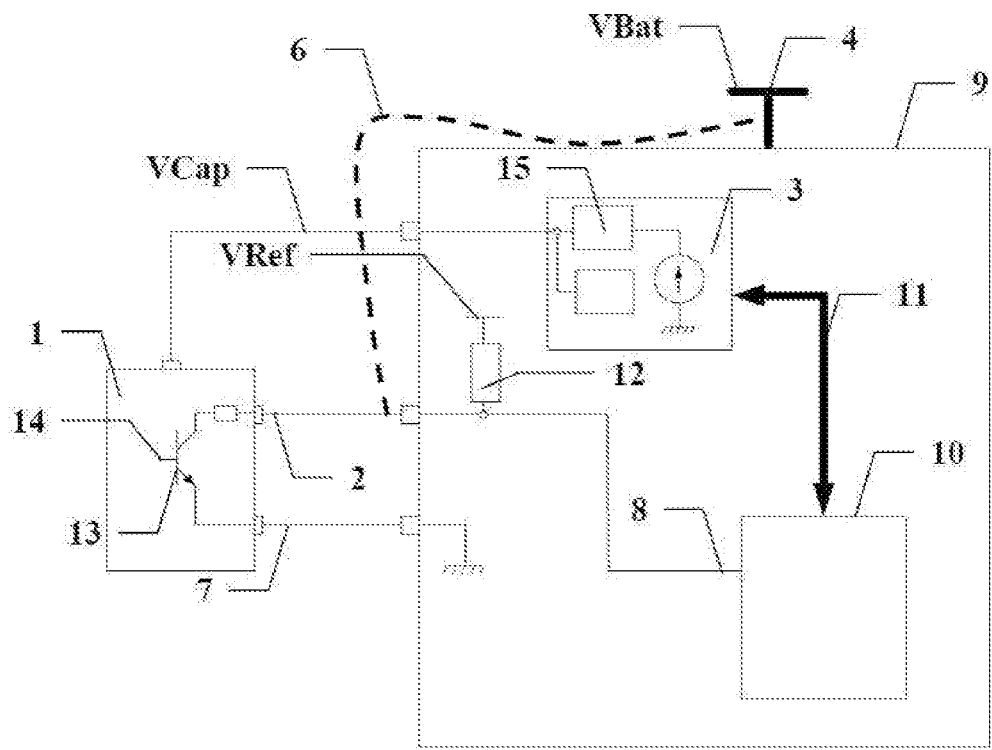

METHOD FOR DIAGNOSING A SPEED/POSITION SENSOR

CROSS-REFERENCE TO RELATED APPLICATIONS

This application is the U.S. national phase of International Application No. PCT/EP2021/058483 filed Mar. 31, 2021 which designated the U.S. and claims priority to FR Patent Application No. 2003245 filed Apr. 1, 2020, the entire contents of each of which are hereby incorporated by reference.

TECHNICAL FIELD

The invention relates to the field of motor vehicle engine control and more particularly a speed/position sensor and its diagnostic means.

PRIOR ART

As is known, in a motor vehicle, a crankshaft sensor observes the rotation of the crankshaft. For this purpose it comprises a toothed wheel, which rotates as one with the crankshaft, and a matter detector which is able to detect a tooth, fixed relative to the engine frame, arranged opposite the teeth of the toothed wheel. When the engine and therefore the crankshaft and therefore the toothed wheel rotates, the detector detects the presence or the absence of matter and produces an all-or-nothing signal with two states, high and low, one state corresponding to a tooth, the presence of matter, and the other corresponding to an inter-tooth gap, the absence of matter. This signal makes it possible for the engine control to count the teeth and to be informed about the angular position and the rotational speed of the crankshaft and therefore of the engine. For this purpose the detector is electrically connected to a transistor by its base in order to switch it and to produce a square-wave signal making it possible for the engine control to count the teeth.

A camshaft sensor operates substantially according to the same principle and makes it possible to inform the engine control about the position and the rotational speed of the camshaft.

In the present application "speed/position sensor" denotes either a crankshaft sensor or a camshaft sensor.

If the output of a speed/position sensor exhibits a short circuit with a power supply, the engine control sees the same state for the output of the speed/position sensor all the time independently of the position of the detector, whether the latter is facing a tooth or a gap.

SUMMARY OF THE INVENTION

The invention proposes to refine the short circuit diagnosis by distinguishing whether this short circuit is a short circuit with the power supply of the speed/position sensor or is a short circuit with another power supply, such as the battery power supply.

For this purpose, the subject of the invention is a method for diagnosing a speed/position sensor of an internal combustion engine, of the type comprising a toothed wheel, which rotates as one with a shaft, and a matter detector, which is arranged so as to be fixed opposite the toothed wheel and controls a base of a transistor, comprising the following steps:
  detecting a short circuit between an output of the speed/position sensor and a power supply,
  testing for excess current consumption by a power supply of the speed/position sensor, when the transistor is activated: if the test is positive, the short circuit is between the power supply of the speed/position sensor and the output of the position/speed sensor; if the test is negative, the short circuit is between another power supply and the output of the speed/position sensor.

Particular features or embodiments, which may be used alone or in combination, are:
  detecting a short circuit comprises measuring a constant level at the output of the speed/position sensor when a rotation of the engine is detected,
  the speed/position sensor is chosen from among a crankshaft sensor and a camshaft sensor and a rotation of the engine is detected by means of another speed/position sensor, chosen from among a camshaft sensor and a crankshaft sensor,
  the excess consumption test is performed by interrogating the power supply of the speed/position sensor, which self-measures.

In a second aspect of the invention, a motor vehicle engine control implements such a method.

The invention is particularly advantageous in that it makes it possible to add at least one diagnostic function without adding any hardware components.

BRIEF DESCRIPTION OF THE DRAWINGS

The invention will be better understood from reading the following description, given solely by way of example, and with reference to the appended figures, in which:
  FIG. 1 schematically illustrates an engine control and its interface with a speed/position sensor,
  FIG. 2 illustrates the diagram of FIG. 1 with a short circuit between the output pin of the speed/position sensor and the power supply of the speed/position sensor,
  FIG. 3 illustrates the diagram of FIG. 1 with a short circuit between the output pin of the speed/position sensor and the power supply of the engine control.

DESCRIPTION OF THE EMBODIMENTS

With reference to FIG. 1, a speed/position sensor 1 is interfaced with an engine control. An engine control 9 is the set of items of measurement, processing and actuation equipment which make it possible to control the operation of an internal combustion engine. The tooth detector, which is not shown, is connected to the base 14 of a transistor 13. The emitter of this transistor 13 is connected to ground 7. The collector of this transistor 13 is connected to an output 2 of the speed/position sensor 1, which is itself connected to an input 8 of a control unit 10 of an engine control 9. A pull-up resistor 12 connects this output 2 to a reference voltage VRef. A power supply 3 supplies power to the speed/position sensor 1 at a voltage VCap. The engine control 9 is supplied with power by another power supply 4, typically at the battery voltage VBat.

In nominal mode, when the engine rotates, the input 8 of the control unit 10 sees, relayed by the transistor 13, an all-or-nothing signal changing state depending on what the detector sees, a tooth or an inter-tooth gap.

In contrast, in the event of a short circuit between the output 2 of the speed/position sensor 1 and a power supply 3, 4, the input 8 of the control unit 10 sees, because of the voltage VCap, VBat, VRef or other applied to the line 2, 8, a constant, in this instance high, level.

It is advantageous to refine the short circuit diagnosis and to determine which power supply 3, 4 the short circuit is produced with.

An obvious solution might be to replace or associate the input 8 with an analog input for measuring a voltage or indeed a two-threshold logic comparator. However, such a solution comes at significant extra cost.

As illustrated in FIG. 2, a short circuit 5 may be present between the output 2 of the speed/position sensor 1 and the power supply 3 of the speed/position sensor 1. As illustrated in FIG. 3, a short circuit 6 may be present between the output 2 of the speed/position sensor 1 and another power supply, such as, for example, the power supply 4 of the engine control 9.

For this purpose the method for diagnosing a speed/position sensor 1 of an internal combustion engine, of the type comprising a toothed wheel, which rotates as one with a shaft, and a matter detector, which is arranged so as to be fixed opposite the toothed wheel and controls a base 13 of a transistor 14, comprises according to the invention the following steps. The method is initiated by detecting a short circuit 5, 6 between an output 2 of the speed/position sensor 1 and a power supply 3, 4. When the detector sees a tooth edge, the transistor 13 closes and causes excess consumption by the power supply 3 of the speed/position sensor 1. An excess current consumption test is then performed in order to detect possible excess consumption. Said detection is advantageously performed while the transistor 13 is activated. This test targets the power supply 3 of the speed/position sensor 1. This power supply is most often integrated into the engine control 9. If the response to the test is positive, indicating excess current consumption by the power supply 3 of the speed/position sensor 1, it is deduced from this that the short circuit 5 is between the power supply 3 of the speed/position sensor 1 and the output 2 of the speed/position sensor 1. If the response to the test is negative, it is concluded that the short circuit 6 is between another power supply and the output 2 of the speed/position sensor 1. It may reasonably be considered that this other power supply is the power supply 4 of the engine control 9 or battery power supply, at a voltage VBat.

According to another feature, a short circuit 5, 6 is detected by the control unit 10 by measuring a constant level at the output 2 of the speed/position sensor 1 when a rotation of the engine is detected.

A condition exhibiting a constant level at the output 2 due to an absence of rotation of the engine should be distinguished from the same condition caused by a short circuit 5, 6. The sensor which observes the rotation of the engine is the speed/position sensor 1. Now, in the present condition the latter is not operational. Thus, another speed/position sensor is used.

A camshaft rotates substantially as one with the crankshaft. Thus, if the position/speed sensor 1 diagnosed is a crankshaft sensor, a camshaft sensor may advantageously constitute a backup rotating engine indicator in the event of the crankshaft sensor failing. Conversely, if the speed/position sensor 1 diagnosed is a camshaft sensor, a crankshaft sensor, or indeed another camshaft sensor, may advantageously constitute a backup rotating engine indicator in the event of the first camshaft sensor failing.

According to another feature, the excess consumption test is performed by interrogating the power supply 3 of the position/speed sensor 1. The power supply 3 of the position/speed sensor 1 comprises self-monitoring means, such as an ammeter 15. It is thus capable of determining whether its consumption is nominal or raised. The power supply 3 communicates the measurement result to the control unit 10 via any communication means, for example a bus 11, for example in the SPI format.

The engine control 9 is the unit at the heart of the problem. It possesses the measurement, processing and actuation means for performing the various steps of the method described above. Thus, the invention further relates to a motor vehicle engine control 9, implementing the method according to one of the features described previously.

The invention has been illustrated and described in detail in the drawings and the preceding description. The latter should be considered as illustrative and given by way of example and not as limiting the invention to this description only. Numerous variant embodiments are possible.

LIST OF REFERENCE SIGNS

1: position/speed sensor,
2: output,
3: sensor power supply,
4: engine control/battery power supply,
5, 6: short circuit,
7: ground,
8: input,
9: engine control,
10: control unit,
11: communication bus,
12: pull-up resistor,
13: transistor,
14: base of the transistor,
15: self-ammeter.

The invention claimed is:

1. A method for diagnosing a speed sensor or a position sensor of an internal combustion engine, the speed sensor or the position sensor including a toothed wheel, which rotates as one with a shaft, and a matter detector, which is configured to be fixed opposite the toothed wheel and controls a base of a transistor, the method comprising:
   detecting a short circuit between an output of the speed sensor or the position sensor and one of: (i) a power supply of the speed sensor or the position sensor, and (ii) another power supply;
   testing for excess current consumption by the power supply of the speed sensor or the position sensor when the transistor is activated; and
   determining that the short circuit is between the power supply of the speed sensor or the position sensor and the output of the speed sensor or the position sensor, when the test is positive, and determining that the short circuit is between the other power supply and the output of the speed sensor or the position sensor, when the test is negative.

2. The method as claimed in claim 1, wherein the detecting the short circuit comprises measuring a constant level at the output of the speed sensor or the position sensor when a rotation of the engine is detected.

3. The method as claimed in claim 2, wherein the speed sensor or the position sensor is one of a crankshaft sensor and a camshaft sensor, and
   wherein a rotation of the engine is detected by another speed sensor or another position sensor, that is one of a camshaft sensor and a crankshaft sensor.

4. The method as claimed in claim 2, wherein the excess consumption testing is performed by interrogating the power supply of the speed sensor or the position sensor which self-measures.

5. A motor vehicle engine control, comprising:
one or more processors configured to implement the method as claimed in claim 2.

6. The method as claimed in claim 3, wherein the excess consumption testing is performed by interrogating supply of the speed sensor or the position sensor which self-measures.

7. A motor vehicle engine control, comprising:
one or more processors configured to implement the method as claimed in claim 3.

8. A motor vehicle engine control, comprising:
one or more processors configured to implement the method as claimed in claim 6.

9. A motor vehicle engine control, comprising:
one or more processors configured to implement the method as claimed in claim 4.

10. The method as claimed in claim 1, wherein the speed sensor or the position sensor is one of a crankshaft sensor and a camshaft sensor, and
wherein a rotation of the engine is detected by another speed sensor or another position sensor, that is one of a camshaft sensor and a crankshaft sensor.

11. The method as claimed in claim 10, wherein the excess consumption testing is performed by interrogating the power supply of the speed sensor or the position sensor which self-measures.

12. A motor vehicle engine control, comprising:
one or more processors configured to implement the method as claimed in claim 10.

13. A motor vehicle engine control, comprising:
one or more processors configured to implement the method as claimed in claim 11.

14. The method as claimed in claim 1, wherein the excess consumption testing is performed by interrogating the power supply of the speed sensor or the position sensor which self-measures.

15. A motor vehicle engine control, comprising:
one or more processors configured to implement the method as claimed in claim 14.

16. A motor vehicle engine control, comprising:
one or more processors configured to implement the method as claimed in claim 1.

* * * * *